US012809343B2

(12) United States Patent
Kizu et al.

(10) Patent No.: US 12,809,343 B2
(45) Date of Patent: Nov. 24, 2026

(54) CONTROL DEVICE, SYNCHRONIZATION SYSTEM, AND MACHINE CONTROL METHOD FOR OUTPUTTING A SYNCHRONIZATION COMMAND TO AN OSCILLATION DEVICE THAT GENERATES SOUND OR VIBRATION

(71) Applicant: Mitsubishi Electric Corporation, Tokyo (JP)

(72) Inventors: Yuichi Kizu, Tokyo (JP); Takashi Kai, Tokyo (JP); Hiroyuki Sekiguchi, Tokyo (JP); Hidetoshi Ikeda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 586 days.

(21) Appl. No.: 18/265,435

(22) PCT Filed: Dec. 18, 2020

(86) PCT No.: PCT/JP2020/047495
§ 371 (c)(1),
(2) Date: Jun. 6, 2023

(87) PCT Pub. No.: WO2022/130627
PCT Pub. Date: Jun. 23, 2022

(65) Prior Publication Data

US 2023/0418265 A1 Dec. 28, 2023

(51) Int. Cl.
*G06F 7/58* (2006.01)
*G01H 17/00* (2006.01)
(Continued)

(52) U.S. Cl.
CPC ....... *G05B 19/4155* (2013.01); *G05B 19/406* (2013.01); *G06F 7/588* (2013.01);
(Continued)

(58) Field of Classification Search
CPC .............. G05B 19/4155; G05B 19/406; G05B 2219/37532; G05B 23/0221;
(Continued)

(56) References Cited

U.S. PATENT DOCUMENTS

| | | | | |
|---|---|---|---|---|
| 11,506,568 | B2 | 11/2022 | Tezuka | |
| 2017/0080970 | A1* | 3/2017 | Kezobo | B60K 35/60 |

(Continued)

FOREIGN PATENT DOCUMENTS

| | | | |
|---|---|---|---|
| CN | 104215320 | A | 12/2014 |
| CN | 106170686 | A | 11/2016 |

(Continued)

OTHER PUBLICATIONS

International Search Report and Written Opinion mailed on Feb. 2, 2021, received for PCT Application PCT/JP2020/047495, filed on Dec. 18, 2020, 8 pages including English Translation.

(Continued)

*Primary Examiner* — Jonathan Michael Skrzycki
(74) *Attorney, Agent, or Firm* — XSENSUS LLP

(57) ABSTRACT

A control device is connected to a synchronization device synchronizing operation data obtained by acquiring information about driving of a machine in time series and measurement data obtained by acquiring information about sound or vibration of the machine in time series by using features of data acquired in time series, and includes a user command generation unit generating a user command to drive the machine according to an instruction from a user of the control device, a synchronization command storage unit storing reproduction information capable of reproducing a synchronization command used for the synchronization at predetermined timing, a synchronization command generation unit generating the synchronization command based on the reproduction information, and a synchronization com- (Continued)

mand output unit outputting, at predetermined timing of the user command, the synchronization command to an oscillation device that generates sound or vibration, and adding effect of the synchronization command to the measurement data.

20 Claims, 11 Drawing Sheets

(51) Int. Cl.
*G05B 19/406* (2006.01)
*G05B 19/4155* (2006.01)
*G01D 18/00* (2006.01)

(52) U.S. Cl.
CPC ............ *G01D 18/00* (2013.01); *G01H 17/00* (2013.01); *G05B 2219/37532* (2013.01)

(58) Field of Classification Search
CPC .... G05B 23/0216; G06F 7/588; G01D 18/00; G01H 17/00
See application file for complete search history.

(56) References Cited

U.S. PATENT DOCUMENTS

| | | | | |
|---|---|---|---|---|
| 2019/0383701 | A1* | 12/2019 | Tezuka | G05B 23/0221 |
| 2020/0064403 | A1* | 2/2020 | Wendler | G01R 31/31912 |
| 2020/0072660 | A1* | 3/2020 | Tekeli | G01H 3/06 |
| 2020/0379441 | A1* | 12/2020 | Inagaki | B25J 9/1694 |
| 2023/0133532 | A1* | 5/2023 | Kumamoto | B23F 23/12 409/38 |

FOREIGN PATENT DOCUMENTS

| | | | |
|---|---|---|---|
| CN | 110609520 | A | 12/2019 |
| JP | 2010-266327 | A | 11/2010 |
| JP | 2019-219725 | A | 12/2019 |

OTHER PUBLICATIONS

Office Action mailed on Mar. 21, 2025 for the corresponding Chinese patent application No. 202080107162.9 and an English machine translation thereof, 25pp.

* cited by examiner

CONTROL DEVICE, SYNCHRONIZATION SYSTEM, AND MACHINE CONTROL METHOD FOR OUTPUTTING A SYNCHRONIZATION COMMAND TO AN OSCILLATION DEVICE THAT GENERATES SOUND OR VIBRATION

CROSS-REFERENCE TO RELATED APPLICATION

The present application is based on PCT filing PCT/JP2020/047495, filed Dec. 18, 2020, the entire contents of which are incorporated herein by reference.

FIELD

The present disclosure relates to a control device that synchronously outputs a plurality of pieces of time-series data, a synchronization system, and a machine control method.

BACKGROUND

It is known that in general, in a device including a power source such as a motor, driving sound of the power source or a machine as an object to be driven by the power source includes a lot of information regarding states of the power source and the machine. Therefore, there is known a technique for acquiring measurement data representing sound or vibration emitted by a machine simultaneously with operation data which is information about the driving of the machine, selecting a section suitable for factor determination from the acquired data, and performing the factor determination for a failure or sound or vibration of a power source and the machine. However, in order to simultaneously acquire the operation data and the measurement data representing sound or vibration, the sound or vibration needs to be acquired on a device synchronized with the machine, and thus there is an installation problem. As a solution to the problem, there is known a technique for synchronizing acquired measurement data and operation data by performing a predetermined calculation on the acquired data.

For example, Patent Literature 1 discloses a technique for synchronizing measurement data and operation data by extracting a feature indicating a predetermined operation from each of the measurement data and the operation data, and matching time points indicating the extracted features.

CITATION LIST

Patent Literature

Patent Literature 1: Japanese Patent Application Laid-open No. 2019-219725

SUMMARY

Technical Problem

However, in the technique described in Patent Literature 1, there is a problem in that the accuracy of synchronization between the measurement data and the operation data depends on the feature of the predetermined operation. Therefore, a user who performs the factor determination has to carefully set in each case the feature to be extracted for synchronization depending on drive patterns of the power source and the machine to be diagnosed so as not to cause confusion with other operations.

The present disclosure has been made in view of the above, and an object thereof is to provide a control device capable of synchronizing a plurality of types of time-series data stably regardless of drive patterns of a power source and a machine to be diagnosed and easily as compared with conventional ones.

Solution to Problem

In order to solve the above problem and achieve the object, a control device according to the present disclosure is a control device that is connected to a synchronization device synchronizing operation data obtained by acquiring information about driving of a machine in time series and measurement data obtained by acquiring information about sound or vibration of the machine in time series by using features of data acquired in time series, and includes a user command generation unit, a synchronization command storage unit, a synchronization command generation unit, and a synchronization command output unit. The user command generation unit generates a user command that is a command to drive the machine in accordance with an instruction from a user of the control device. The synchronization command storage unit stores reproduction information capable of reproducing a synchronization command that is a command used for the synchronization at a predetermined timing. The synchronization command generation unit generates the synchronization command on the basis of the reproduction information. The synchronization command output unit outputs, at a predetermined timing of the user command, the synchronization command to an oscillation device that generates sound or vibration, and adds an effect of the synchronization command to the measurement data.

Advantageous Effects of Invention

The control device according to the present disclosure achieves an effect that it is possible to synchronize a plurality of types of time-series data stably regardless of drive patterns of a power source and a machine to be diagnosed and easily as compared with conventional ones.

DESCRIPTION OF EMBODIMENTS

Hereinafter, a control device, a synchronization system, and a machine control method according to each embodiment of the present disclosure will be described in detail with reference to the drawings.

First Embodiment

Figure 1:
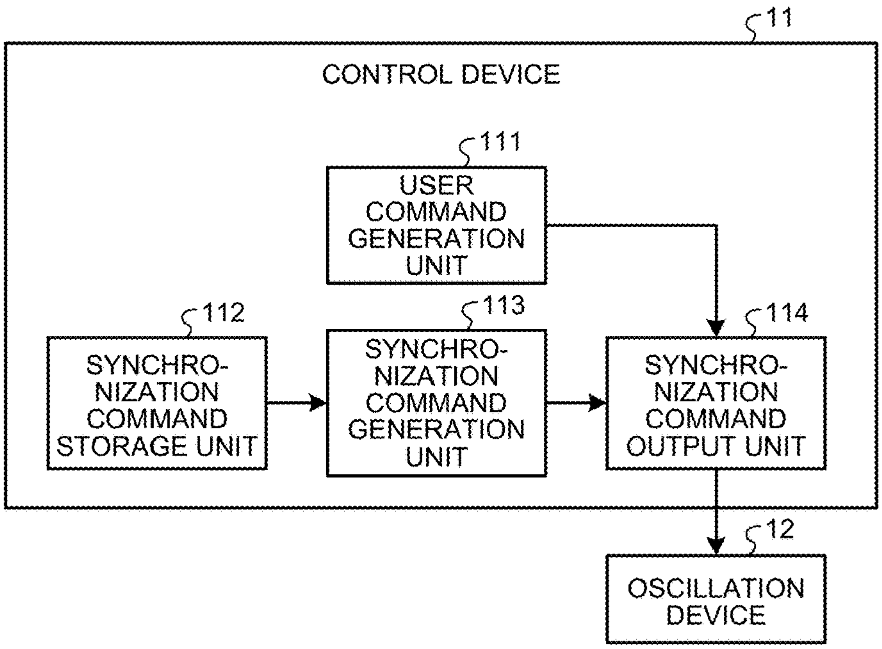
FIG. 1 is a block diagram illustrating an example of a functional configuration of a control device according to a first embodiment.

FIG. 1 is a block diagram illustrating an example of a functional configuration of a control device according to a first embodiment. A control device 11 is a device that controls an object to be driven by a power source in a device that includes the power source. FIG. 1 illustrates, among configurations of the control device 11, only the configuration necessary for synchronizing operation data obtained by acquiring information about the driving of the object to be driven in time series and measurement data obtained by acquiring information about sound or vibration emitted by the object to be driven in time series by using features of the data acquired in time series. The control device 11 in FIG. 1 includes a user command generation unit 111, a synchronization command storage unit 112, a synchronization command generation unit 113, and a synchronization command output unit 114.

The user command generation unit 111 generates a command to drive a machine (not illustrated) as an object to be driven connected to the control device 11 as intended by a user, that is, in accordance with an instruction of the user. Examples of the command generated by the user command generation unit 111 include time-series commands regarding a position, a speed, and a current to be given to a motor which is the power source provided in the machine. The user command generation unit 111 may generate a user command by reading a command given from the user in advance from a memory, or may generate a user command on the basis of a command given from a higher-level device.

The synchronization command storage unit 112 stores reproduction information capable of reproducing a synchronization command to be output at a predetermined timing when the user command is executed by the machine. The synchronization command is a command used for synchronization. The reproduction information to be stored may be a time-series output value of the synchronization command or the like, or may be a numerical value that defines the synchronization command such as an output time or a stop time of the synchronization command or the like. In one example, the reproduction information can be a command pattern capable of reproducing the synchronization command at a predetermined timing. The synchronization command storage unit 112 may also store command execution position information indicating at which timing of the user command the synchronization command is executed. By storing the command execution position information in the synchronization command storage unit 112, the synchronization command can be executed at a position that does not affect a machine operation intended by the user. Here, an object of the synchronization command may be an object different from that of the user command.

The synchronization command generation unit 113 generates the synchronization command on the basis of the reproduction information stored in the synchronization command storage unit 112. The synchronization command is generated as a command synchronized with the user command.

The synchronization command output unit 114 outputs the synchronization command generated by the synchronization command generation unit 113 to an oscillation device 12 at a predetermined timing, and adds the effect of the synchronization command to the measurement data. Since the synchronization command is a command synchronized with the user command, the synchronization command is output at a predetermined timing of the user command. The synchronization command may be output immediately after the start of the user command, or may be output immediately before the start of driving by the user command, during acceleration/deceleration of the motor, at a time during a constant speed or an interval between driving and driving, or at a timing when a certain time has elapsed after the end of driving. These timings may be defined in the command execution position information.

The oscillation device 12 is a device that is connected to the control device 11 and generates sound or vibration by the synchronization command output from the synchronization command output unit 114. A buzzer, a siren, or the like attached to a device is an example of the oscillation device 12. FIG. 1 illustrates a case where the oscillation device 12 is externally attached as a device to the control device 11. However, the oscillation device 12 may be configured to be incorporated in the control device 11 as an oscillation unit. In addition, as the oscillation device 12, not a device dedicated to oscillation, but an existing device that generates sound or vibration by a command may be used. Examples of the oscillation device 12 include devices including the followings: a relay or a circuit breaker that emits sound by opening and closing, a converter that generates vibration of a switching frequency by a command, an actuator that emits a specific sound during operation, or the like. With the use of an existing device, synchronization can be performed at a low cost.

The sound or vibration generated by the oscillation device 12 is desirably sound or vibration that can be distinguished, by a frequency, a magnitude, an emission time, and an emission interval thereof, changes therein, and the like, from sound or vibration which is not an object to be observed including sound or vibration generated when the machine is driven by the user command, an environmental sound observed at a place where the machine is installed, and noise. For example, sound or vibration continuously generated at a specific intensity or a specific frequency for a predetermined time, or sound or vibration in which these vibrations are periodically generated can be exemplified.

Figure 2:
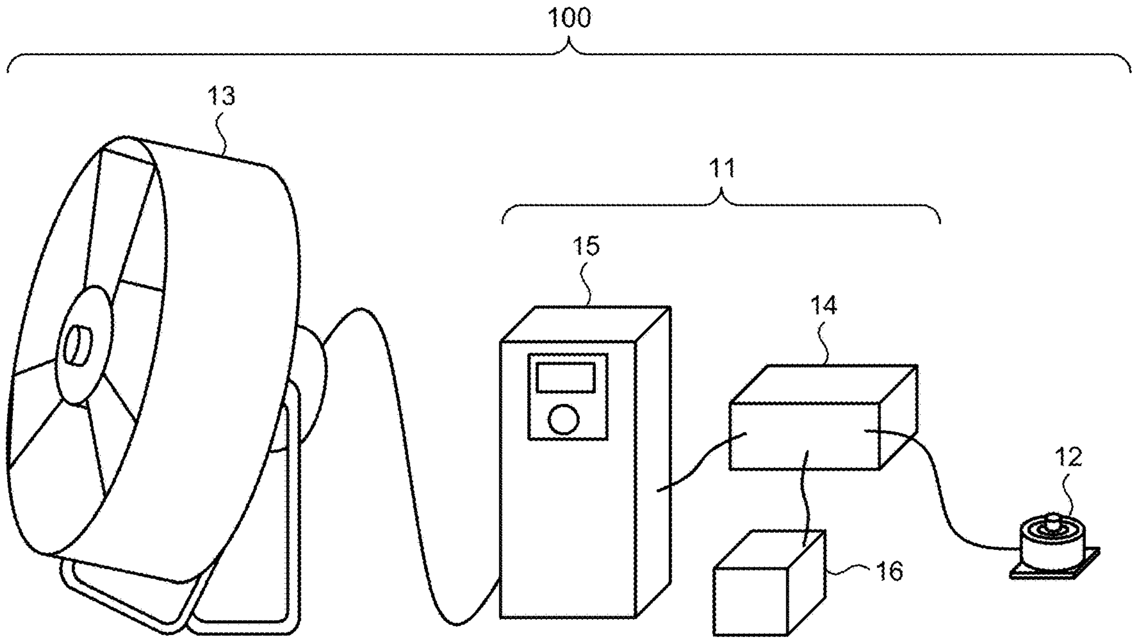
FIG. 2 is a view illustrating an example of a hardware configuration of a blowing device including the control device according to the first embodiment.

FIG. 2 is a view illustrating an example of a hardware configuration of a blowing device including the control device according to the first embodiment. As illustrated in FIG. 2, a blowing device 100 includes the control device 11, the oscillation device 12, and a blower 13 that generates wind by rotating an impeller by a motor. In addition, the control device 11 includes a controller 14 that stores commands intended by the user in time series and generates commands, an inverter 15 that supplies a current to the blower 13, and a logger 16 that records the operation of the blower 13 in time series as operation data.

The controller 14 stores a command set by the user, and generates a command to be given to the inverter 15 so as to cause the blower 13 to perform an operation intended by the user. In one example, the controller 14 includes the user command generation unit 111, the synchronization command storage unit 112, the synchronization command generation unit 113, and the synchronization command output unit 114 illustrated in FIG. 1. In addition, the controller 14 is connected to the oscillation device 12 and outputs a synchronization command to the oscillation device 12.

The inverter 15 converts the command generated by the controller 14 into a command of a current to be supplied to the motor. The inverter 15 supplies a current to the blower 13 in accordance with the converted command.

The logger 16 is connected to the controller 14, and stores an operating state of the blower 13 as time series data on the basis of information such as a command in the controller 14. The operating state of the blower 13 stored as time series data is operation data.

In the first embodiment, the control device 11 includes the controller 14, the inverter 15, and the logger 16, but the control device 11 only needs to be a device capable of controlling the blower 13 which is a machine, and may have another configuration. For example, one device may perform from generation of a command to supply of a current, or a configuration including a plurality of devices may be employed. In addition, the number of shafts driven by the control device 11 may be one, or may be more than one. The user command generation unit 111, the synchronization command storage unit 112, the synchronization command generation unit 113, and the synchronization command output unit 114 may be included in a specific device of the control device 11, or may be separately included in a plurality of devices.

The blower 13 is a device that is electrically connected to the control device 11 and receives an electric signal from the control device 11 to thereby rotate the motor attached to the impeller to blow air. The blower 13 is operated in accordance with a command generated by the user command generation unit 111 included in the control device 11.

Figure 3:
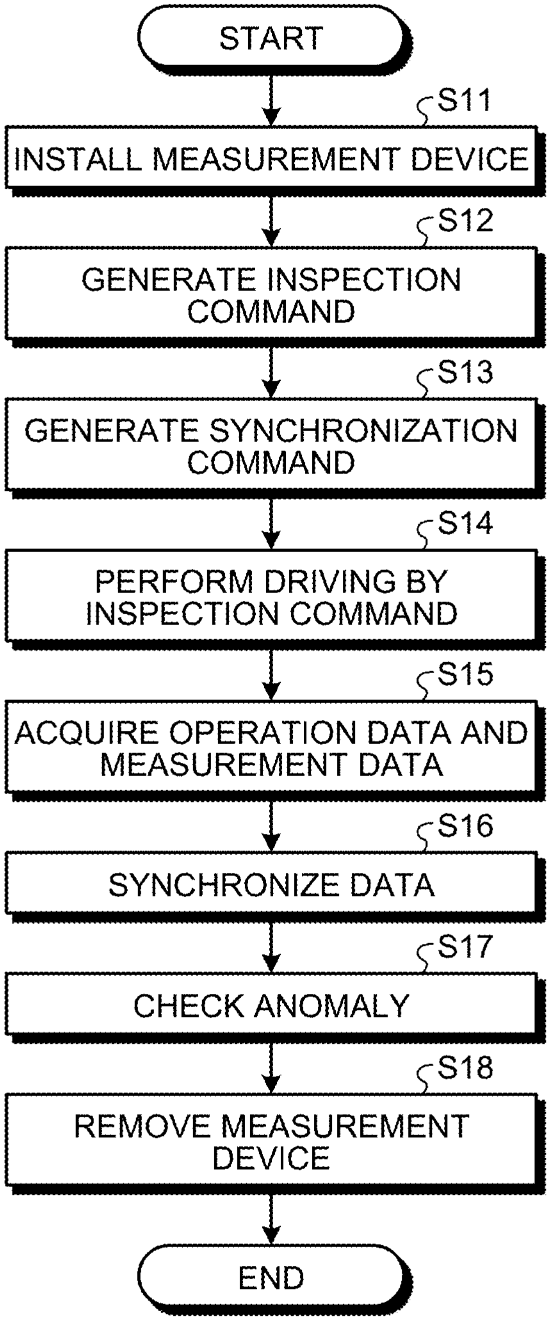
FIG. 3 is a flowchart illustrating an example of an inspection procedure of a blower including a procedure of a synchronization method using the control device according to the first embodiment.

Next, an example of a synchronization method using the control device 11 according to the first embodiment will be described by taking an inspection procedure with a blowing sound of the blower 13 in the blowing device 100 of FIG. 2 as an example. FIG. 3 is a flowchart illustrating an example of an inspection procedure of the blower including a procedure of the synchronization method using the control device according to the first embodiment. As illustrated in FIG. 3, the inspection procedure of the blower 13 includes eight steps from step S11 to step S18, and among these steps, steps from step S12 to step S16 correspond to a synchronization procedure using the control device 11. The inspection is performed for the purpose of diagnosing the presence or absence of anomaly in the blowing device 100, and the presence or absence of anomaly is determined on the basis of a response of driving sound of the blower 13 to an inspection command when the blower 13 is driven by the command. In the inspection, it is necessary to measure the response of the driving sound to the inspection command, so that it is necessary to synchronize the inspection command which is the operation data with the driving sound which is the measurement data. Each process in FIG. 3 will be described in detail.

(1) Installation of Measurement Device 17 in Step S11

Figure 4:
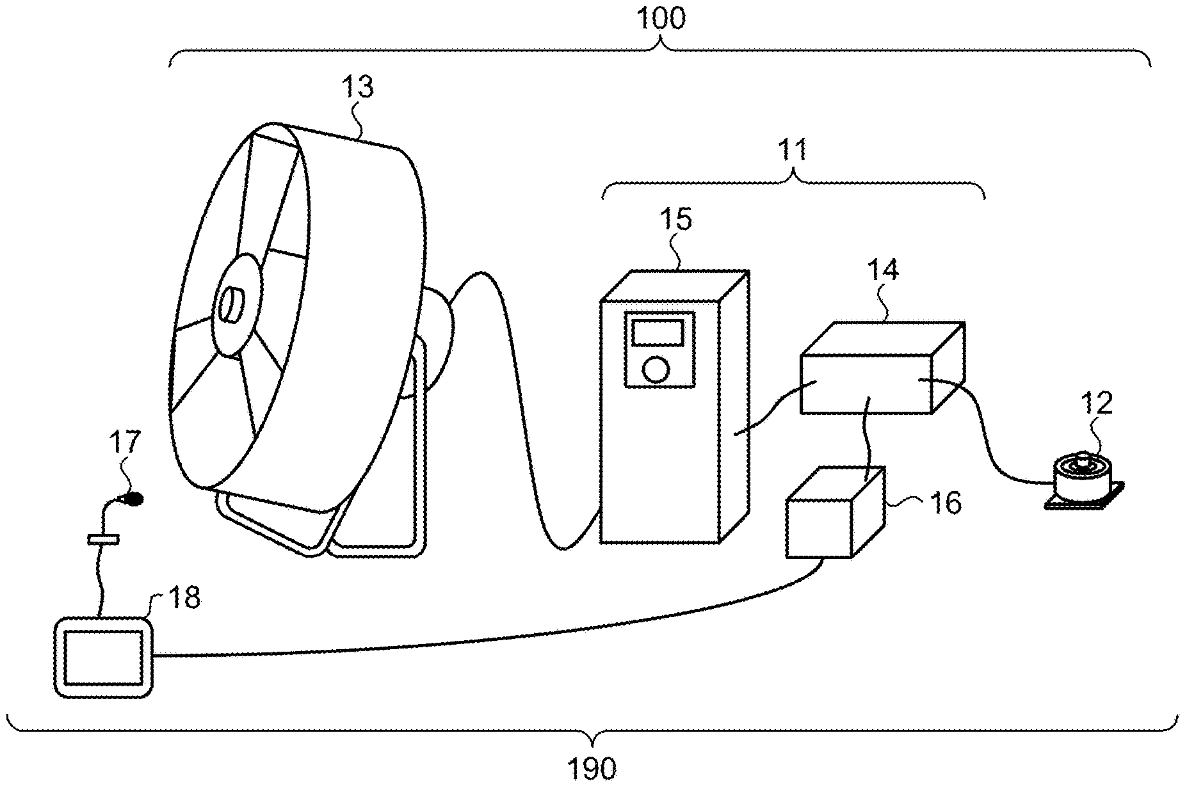
FIG. 4 is a view illustrating an example of a hardware configuration of a synchronization system including the control device according to the first embodiment.

First, the user performing the inspection installs a measurement device used for the inspection in the blowing device 100 illustrated in FIG. 2. FIG. 4 is a view illustrating an example of a hardware configuration of a synchronization system including the control device according to the first embodiment. Here, a case is illustrated where the synchronization system is applied to a blowing system 190 including the measurement device 17 installed in step S11. The blowing system 190 illustrated in FIG. 4 includes the blowing device 100 illustrated in FIG. 2, the measurement device 17, and an inspection terminal 18. Hereinafter, the same components as those in FIGS. 1 and 2 will be denoted by the same reference numerals as those therein, descriptions thereof will be omitted, and differences from FIG. 2 will be described.

The measurement device 17 acquires measurement data obtained by measuring sounds or vibrations emitted by the blower 13 and the oscillation device 12 in time series. The measurement device 17 is installed near both of the blower 13 and the oscillation device 12 so as to be able to measure sounds or vibrations emitted from both thereof.

The inspection terminal 18 is connected to the logger 16 which is an operation data acquisition unit of the blowing device 100 and the measurement device 17, and generates inspection data of the blowing device 100 in which operation data of the blowing device 100 acquired by the logger 16 and measurement data acquired by the measurement device 17 are synchronized with each other. The inspection terminal 18 is an example of a synchronization device that synchronizes, by using features of data acquired in time series, operation data and measurement data acquired by driving the blower 13 which is a machine by using the control device 11. In the installation of the measurement device 17 in step S11, at the very least, it is enough for the measurement device 17 to be installed. Although the inspection terminal 18 may be installed simultaneously with the measurement device 17 in step S11, the installation is only required to be performed at any of timings between the installation of the measurement device 17 and a data synchronization process in step S16 to be described later.

Figure 5:
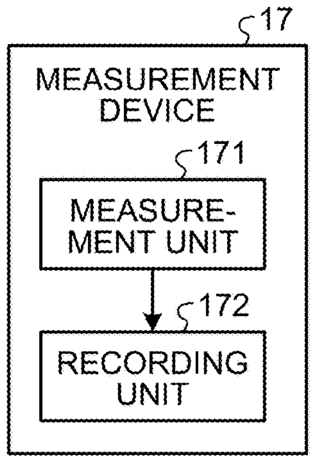
FIG. 5 is a block diagram illustrating an example of a configuration of a measurement device used in the synchronization system according to the first embodiment.

FIG. 5 is a block diagram illustrating an example of a configuration of the measurement device used in the synchronization system according to the first embodiment. As illustrated in FIG. 5, the measurement device 17 includes a measurement unit 171 and a recording unit 172. The measurement unit 171 measures data about sound or vibration caused by the operation of the blower 13. The blowing sound, the acceleration generated in the blower 13, and the like are examples of data measured by the measurement unit 171. The recording unit 172 records the data measured by the measurement unit 171 as measurement data which is time-series data. Examples of the measurement device 17 that measures sound or vibration include a microphone, a vibration meter, an acceleration meter, and an ammeter. Since the measurement device 17 is not used in normal operation, the measurement device 17 is desirably a device easily portable and capable of being installed near a measuring object only at the time of inspection. However, the inspection terminal 18 may incorporate the measurement device 17 therein and use the measurement device 17 incorporated therein at the time of inspection.

(2) Inspection Command Generation Process in Step S12

Next, in the generation of the inspection command in step S12, a command for driving the blower 13 at the time of inspection is set in the control device 11. Here, the command given to the control device 11 may be the same command as that in the normal operation or may be a special command for inspection. At that time, the control device 11 generates a user command by the user command generation unit 111 on the basis of the given command. In this procedure, the inspection command is the user command. The user does not need to set the inspection command every time the inspection is performed, and may use the command given last time, or may set the inspection command as preset when constructing the blowing system 190.

(3) Synchronization Command Generation Process in Step S13

In the generation of the synchronization command in the next step S13, the synchronization command generation unit 113 generates the synchronization command from the reproduction information of the synchronization command stored in advance in the synchronization command storage unit 112. Regarding the form and timing of the synchronization command, it is desirable to use those increasing the synchronization accuracy in a data synchronization process in step S16 described later. Details of the synchronization command will be described later.

(4) Driving Process by Inspection Command in Step S14

Next, in the driving by the inspection command in step S14, the blower 13 is driven on the basis of the user command generated in the generation of the inspection command in step S12. In addition, the synchronization command output unit 114 outputs the synchronization command to the oscillation device 12 on the basis of the user command and the synchronization command, and the oscillation device 12 is caused to oscillate at a timing predetermined in the given command.

Therefore, in the driving process by the inspection command in step S14, the blower 13 is driven in accordance with the given inspection command, and the oscillation device 12 oscillates at a predetermined timing of the driving.

(5) Operation Data and Measurement Data Acquisition Process in Step S15

Regarding the acquisition of the operation data and the measurement data in the next step S15, in the above-described state in the driving process by the inspection command in step S14, the operating state of the blower 13 is recorded as the operation data in the logger 16, and simultaneously, an oscillation state is recorded as the measurement data in the measurement device 17. Here, one piece of operation data may be recorded in the logger 16, or a plurality of pieces of operation data may be recorded simultaneously. However, the logger 16 records operation data including data capable of estimating a timing at which the oscillation device 12 oscillates. The above may be achieved by the logger 16 recording data including, in the operation data, the synchronization command to be output to the oscillation device 12, or may be achieved by the logger 16 directly recording a user command for determining an output timing of the synchronization command. Alternatively, the above may be achieved by recording operation data such as a rotation speed, a motor current, and torque of the blower 13 driven by a user command, and estimating the user command. In the first embodiment, since the operation data is used for inspection, the following description will be given assuming that the user command, the rotation speed of the blower 13, and the motor current of the blower 13 are recorded as the operation data.

In addition, the operation data and the measurement data recorded as the time-series data are recorded for a time including a time point at which the oscillation device 12 is oscillated by the control device 11.

(6) Data Synchronization Process in Step S16

Next, in the data synchronization in step S16, the recorded operation data and measurement data are synchronized by using the inspection terminal 18. The synchronization method performed here may be any method in which synchronization is performed from the measurement data and the operation data. The inspection terminal 18 performs a synchronization process on the operation data and the measurement data, thereby obtaining synchronized measurement data and synchronized operation data.

Figure 6:
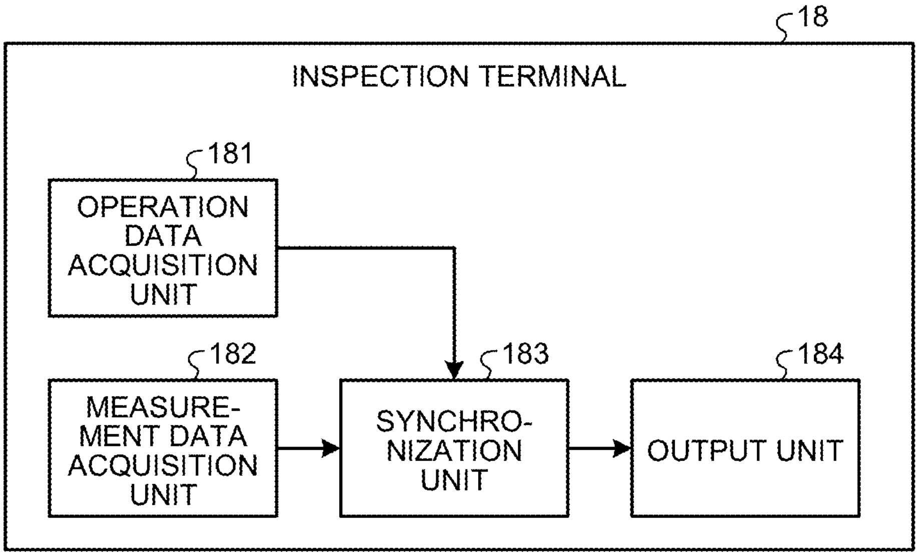
FIG. 6 is a block diagram illustrating an example of a configuration of an inspection terminal used in the synchronization system according to the first embodiment.

FIG. 6 is a block diagram illustrating an example of a configuration of the inspection terminal used in the synchronization system according to the first embodiment. As illustrated in FIG. 6, the inspection terminal 18 includes an operation data acquisition unit 181, a measurement data acquisition unit 182, a synchronization unit 183, and an output unit 184.

The operation data acquisition unit 181 acquires the operation data recorded in the logger 16 in a state where the inspection terminal 18 is connected to the logger 16.

The measurement data acquisition unit 182 acquires the measurement data recorded in the measurement device 17 in a state where the inspection terminal 18 is connected to the measurement device 17.

The acquisition of the operation data by the operation data acquisition unit 181 and the acquisition of the measurement data by the measurement data acquisition unit 182 may be performed simultaneously or individually.

The synchronization unit 183 synchronizes the acquired operation data and measurement data on the basis of features of waveforms of these data. For example, the synchronization unit 183 may use a synchronization method described in Patent Literature 1 in which a time point at which a feature representing a predetermined event appears is extracted from each of the operation data and the measurement data and extracted time points are synchronized and thereby synchronization is performed, or may use a method in which synchronization is performed on the basis of a point at which the correlation between the operation data and the measurement data is highest.

The output unit 184 outputs synchronized operation data and synchronized measurement data, which are synchronized operation data and measurement data, to a monitor or the like. As a result, the synchronized operation data and the synchronized measurement data are clearly indicated to the user who performs the inspection.

Note that the measurement device 17 may be incorporated in the inspection terminal 18. By the measurement device 17 incorporated in the inspection terminal 18, it is possible to save the user the labor of carrying the measurement device 17 and the labor of installing the measurement device 17, and thus the inspection can be performed with less labor.

(7) Anomaly Check Process in Step S17

Next, in an anomaly check in step S17, the presence or absence of anomaly in the blower 13 is checked by the user on the basis of the synchronized measurement data and the synchronized operation data. The user checks the synchronized operation data and measurement data output to the monitor or the like by the inspection terminal 18 to inspect whether an anomaly has occurred in the blower 13. With the inspection terminal 18, it is possible to use the synchronized measurement data and the synchronized operation data, to accurately estimate the cause of the anomaly in the measurement data, and to perform more detailed diagnosis. The inspection terminal 18 may include an anomaly check unit that checks an anomaly by using the synchronized operation data and the synchronized measurement data. In one example, the anomaly check unit can detect an anomalous point by comparing the synchronized operation data and the synchronized measurement data with reference data. The anomaly check unit included in the inspection terminal 18 enables the inspection to be more easily performed.

(8) Removal of Measurement Device 17 in Step S18

Finally, in step S18, the measurement device 17 and the inspection terminal 18 installed for inspection are removed from the measuring object, and thus the inspection ends.

Figure 7:
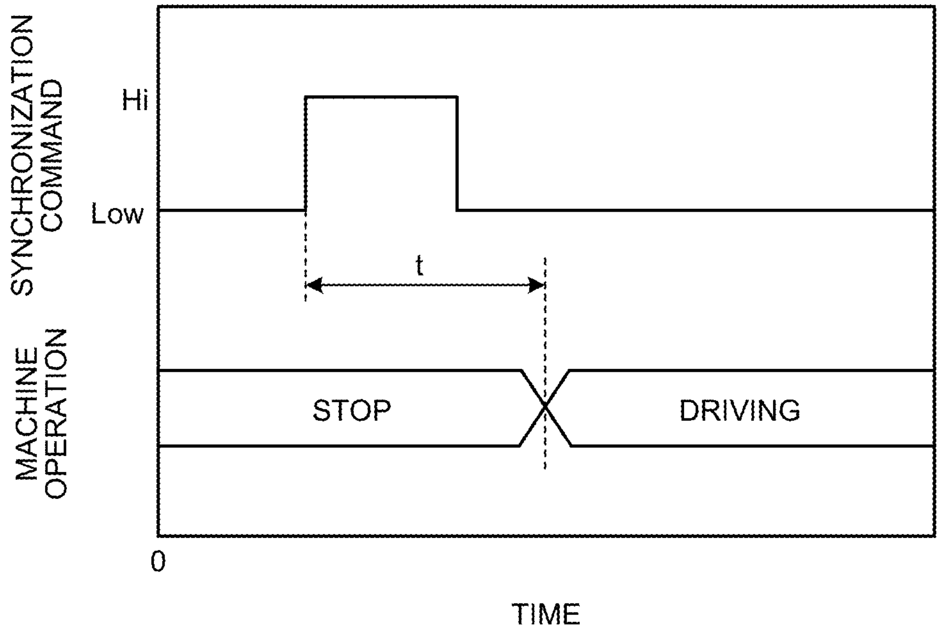
FIG. 7 is a timing chart illustrating an example of a machine operation by a synchronization command and a user command used in the control device according to the first embodiment.

Next, details of generated sound or vibration to be measured by the control device 11 according to the first embodiment will be described. FIG. 7 is a timing chart illustrating an example of a machine operation by a synchronization command and a user command used in the control device according to the first embodiment. In FIG. 7, the horizontal axis represents time. FIG. 7 illustrates a signal waveform of the synchronization command and a driving state of the machine operation. The driving state of the machine operation is the state of the blower 13 driven by the user command, and indicates an example of the user command.

In FIG. 7, it is assumed that the oscillation device 12 emits sound or vibration when the synchronization command is Hi. As illustrated in FIG. 7, the synchronization command in the first embodiment is a rectangular wave that is started t seconds before the driving of the machine by the user command and is output for a certain time.

In order to achieve this behavior, the synchronization command storage unit 112 stores reproduction information necessary for reproducing the behavior. Specifically, start time of output, end time thereof, output time, a position in the user command into which a command is inserted, a trigger condition for inserting the command, an output waveform of the synchronization command of any seconds, or the like is an example of the reproduction information in this example. The synchronization command storage unit 112 stores one or a plurality of items of the above pieces of information as necessary.

The synchronization command output unit 114 checks the user command, and outputs the synchronization command for a certain time from t seconds before the start of the driving. The synchronization command is output for a certain time. As a result, it is possible to easily distinguish sound or vibration oscillated by the oscillation device 12 from noise or vibration generated by other factors or an environmental sound or environmental vibration by the duration of the output of the synchronization command in the anomaly check process. In addition, by adjusting the sound or vibration oscillated by the oscillation device 12 to be sound or vibration having a frequency different from the drive sound or vibration of the blower 13, similar distinction can be made therebetween. The duration is desirably shorter than time t so as not to overlap with the driving of the machine by the user command.

In the first embodiment, as illustrated in FIG. 7, the machine operation is started after the synchronization sound or vibration is generated by the synchronization command. By inserting the synchronization command immediately before the machine operation by the user command, the sound or vibration of the oscillation device 12 can be generated alone, which facilitates identification. Furthermore, since the driving of the machine by the user command and the sound or vibration by the synchronization command do not overlap, synchronization can be performed without affecting the inspection.

The synchronization sound or vibration, by its nature, is sound or vibration generated immediately before the machine operation, so that an alarm buzzer or the like may be used as the oscillation device 12, the alarm buzzer warning particularly a person present near the machine that the machine has been started up.

In the first embodiment, the inspection terminal 18 that is connected to the control device 11 and synchronizes the operation data and the measurement data and the measurement device 17 that acquires the measurement data are devices that are externally retrofitted to the control device 11, but the inspection terminal 18 may be installed in other forms. For example, the inspection terminal 18 may be incorporated in the control device 11, may be installed outside the control device 11 and constantly connected to the control device 11, or the inspection terminal 18 and the measurement device 17 may be installed in forms different from each other. By configuring the inspection terminal 18 to be externally retrofitted to the control device 11, even in a case where there is a change in the control device 11 to be inspected, an inspection procedure, or the like, it is possible to cope with the change with less labor.

The control device 11 according to the first embodiment adds, to the user command, a synchronization command different from the user command which is an operation pattern of the blower 13 set by the user. Since the synchronization command is independent of the user command, the operation data and the measurement data can be stably synchronized regardless of the user command. In particular, even in a case where the user command is a command that hardly generates sound and vibration, and a case where the user command is changed due to a change in use of the machine, maintenance thereof, or the like, the operation data and the measurement data can be stably synchronized. In addition, since the synchronization command is different from the user command, a command suitable for the synchronization method of the inspection terminal 18 to be connected can be selected as the synchronization command, and thus the synchronization accuracy can be improved.

The control device 11 according to the first embodiment generates the synchronization command on the basis of the reproduction information stored in the synchronization command storage unit 112 and capable of reproducing the synchronization command to be output at a predetermined timing. By generating the synchronization command on the basis of such reproduction information, a constant synchronization command can be added to the user command. Therefore, even if the synchronization is performed a plurality of times, the synchronization can be stably performed.

The sound or vibration generated by the synchronization command can easily be changed by changing the reproduction information stored in the synchronization command storage unit 112.

In the control device 11 according to the first embodiment, on the basis of the user command and the synchronization command, the synchronization command output unit 114 outputs the user command to which the synchronization command is added. Since the synchronization command is output at a predetermined timing with respect to the user command, the synchronization command output unit 114 can output the synchronization command at a constant timing with respect to the user command. As a result, it is possible to specify a time point at which the machine operation has started by the user command in the measurement data.

The control device 11 according to the first embodiment performs synchronization by sound or vibration emitted by the oscillation device 12 externally attached to or incorporated in the control device 11. In a case where the oscillation device 12 is externally attached, it is possible to use, as a synchronization sound or vibration, a characteristic sound different from sound or oscillation due to a mechanical operation, and thus it is possible to enhance the accuracy of synchronization. In addition, sound or vibration used for synchronization can be changed as necessary. In particular, even in a case where a plurality of the same machines are used in combination, it is possible by using different oscillation devices 12 to distinguish which oscillation device 12 was started up to generate the sound or vibration. Furthermore, even in a case where the device performing synchronization is changed and the sound or vibration becomes completely different, synchronization can be performed by using the same oscillation device 12 without changing a synchronization condition.

The synchronization system according to the first embodiment includes the measurement device 17 and the inspection terminal 18 as devices different from the control device 11, so that the state of an object to be inspected can be inspected. As a result, even in a case where there is a change in the control device 11 to be inspected, an inspection procedure, or the like, it is possible to cope with the change with less labor. In addition, inspection work can be performed on a plurality of objects to be inspected by one inspection terminal 18. Furthermore, by using an existing facility such as a relay as the oscillation device 12 and rewriting the program of the control device 11 with respect to an existing facility that includes no inspection terminal 18, it is possible to perform inspection using synchronization of a form similar to that of the first embodiment.

Second Embodiment

Figure 8:
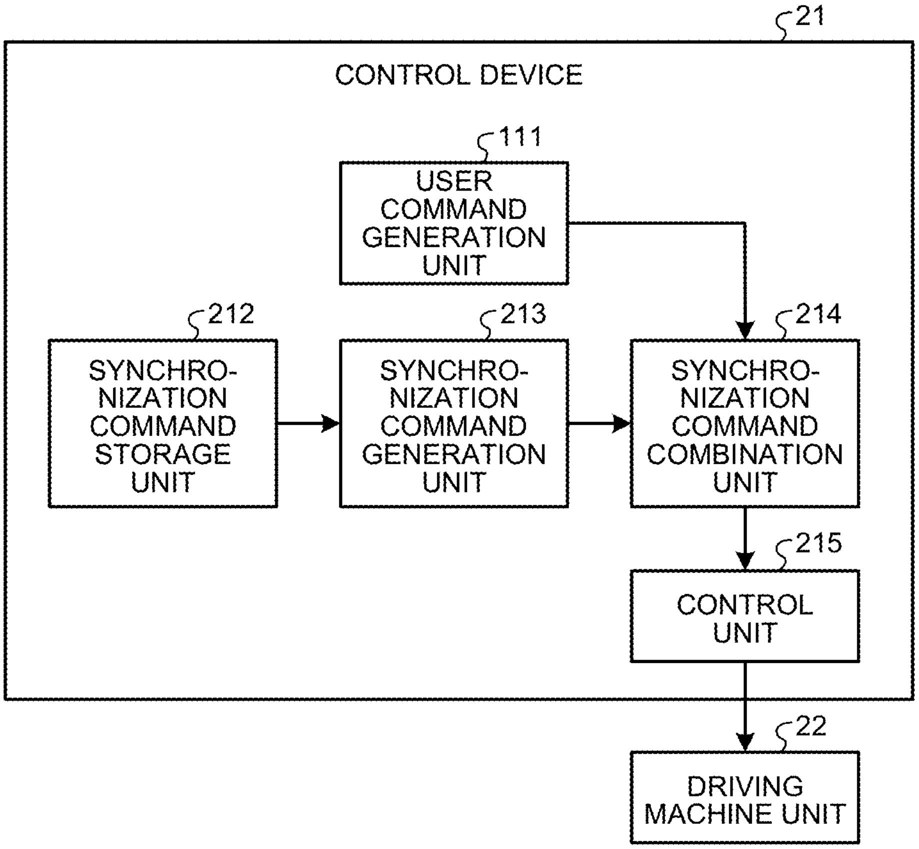
FIG. 8 is a block diagram illustrating an example of a functional configuration of a control device according to a second embodiment.

FIG. 8 is a block diagram illustrating an example of a functional configuration of a control device according to a second embodiment. The same or equivalent components as those in FIG. 1 are denoted by the same reference numerals as those in FIG. 1, and redundant descriptions thereof will be omitted.

In the second embodiment, a configuration is employed in which a synchronization command is superimposed on a motor command, sound or vibration is generated by driving a motor, and operation data and measurement data are synchronized using the generated sound or vibration. A control device 21 in FIG. 8 includes the user command generation unit 111, a synchronization command storage unit 212, a synchronization command generation unit 213, a synchronization command combination unit 214, and a control unit 215.

The synchronization command storage unit 212 stores reproduction information capable of reproducing a synchronization command to be output at a predetermined timing when a user command is executed by a machine. The reproduction information to be stored may be a time-series command of a position command, a speed command, or a current command of the synchronization command, or may be an output time or a stop time of the synchronization command, or a numerical value that defines a synchronization motor command such as a moving distance or a maximum speed of the motor. In addition, the command execution position information indicating at which timing of the user command the synchronization command is executed, or a combination of these pieces of information may be stored.

The synchronization command generation unit 213 generates the synchronization command which is a drive command for driving the machine on the basis of the reproduction information stored in the synchronization command storage unit 212. The synchronization command may be a command having the same dimension as the command to be passed to the control unit 215, or may be a command in the form of a correction value to be processed on the way to the control unit 215.

The synchronization command combination unit 214 adds the user command and the synchronization command together to obtain a combined command. Specifically, on the basis of the command execution position information or information corresponding to the command execution position information, the synchronization command combination unit 214 calculates a combined command in which the synchronization command is added at a predetermined timing of the user command.

The control unit 215 drives a motor included in the driving machine unit 22 connected thereto on the basis of the combined command including the synchronization command thus added. A control method executed by the control unit 215 may be any control method for controlling a motor, and may be based on feedforward control or feedback control.

In FIG. 8, the synchronization command combination unit 214 and the control unit 215 are illustrated as separate functional units, but the synchronization command combination unit 214 may be configured to be incorporated in the control unit 215, and the synchronization command may be added to the user command within the process by the control unit 215.

The driving machine unit 22 is a machine including a motor driven by an electric signal controlled by the control unit 215. The driving machine unit 22 is driven by the control unit 215 on the basis of the user command and the synchronization command. Since the driving machine unit 22 includes a motor, sound or vibration is generated by driving. The sound or vibration is generated, in particular, by execution of the synchronization command. That is, the control unit 215 controls the driving machine unit 22 on the basis of the combined command, and causes the driving machine unit 22 to generate sound or vibration by the driving of the driving machine unit 22 by the synchronization command.

Figure 9:
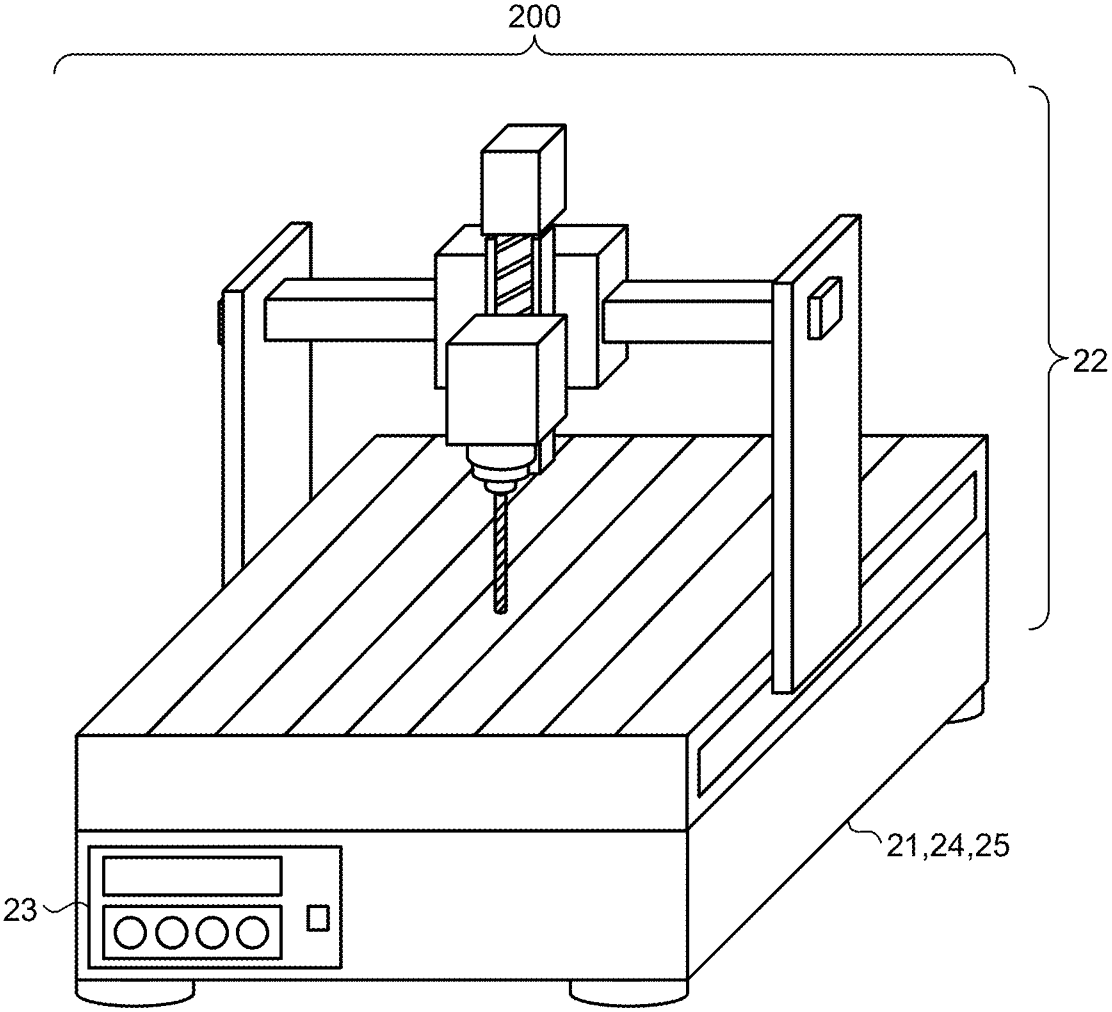
FIG. 9 is a view illustrating an example of a hardware configuration of a synchronization system including the control device according to the second embodiment.
Figure 10:
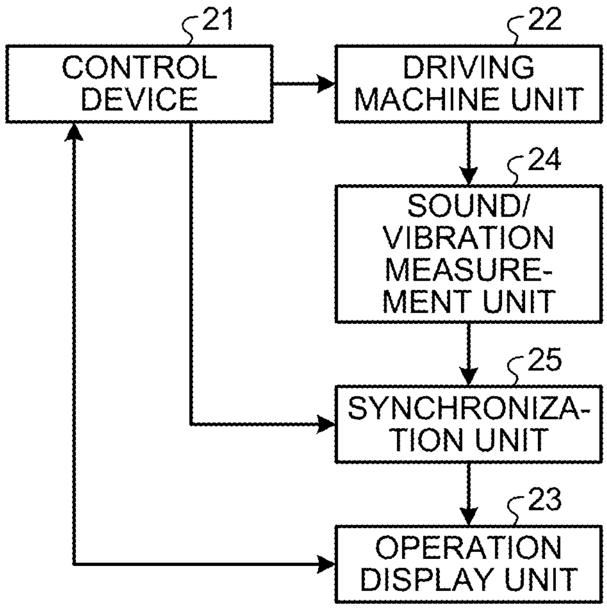
FIG. 10 is a block diagram illustrating an example of a functional configuration of the synchronization system including the control device according to the second embodiment.

FIG. 9 is a view illustrating an example of a hardware configuration of a synchronization system including the control device according to the second embodiment. FIG. 10 is a block diagram illustrating an example of a functional configuration of the synchronization system including the control device according to the second embodiment. Here, a case is illustrated where the synchronization system is applied to a machine tool 200. More specifically, a case is exemplified where the machine tool 200 is a numerical control (NC) drilling machine that is numerically controlled by a computer and performs drilling. As illustrated in FIGS. 9 and 10, the machine tool 200 includes the control device 21, the driving machine unit 22, an operation display unit 23, a sound/vibration measurement unit 24, and a synchronization unit 25. Although the machine tool 200 actually includes many parts, FIGS. 9 and 10 illustrate only some of components for simplicity of description.

The control device 21 has a functional configuration illustrated in FIG. 8. The control device 21 is electrically connected to the driving machine unit 22, and drives and controls the driving machine unit 22 by the user command.

The driving machine unit 22 is a machine unit of the machine tool 200 including an XY table and a Zθ axis, i.e., four axes. The driving machine unit 22 includes a motor, a movable mechanism, wiring, and the like (not illustrated) corresponding to each of the four axes. A workpiece is placed on the XY table. The driving machine unit 22 receives an electric signal controlled by the control device 21, the motor of each axis is driven, and drilling is performed on the workpiece on the XY table. When any of the motors provided in the driving machine unit 22 is driven, sound or vibration is generated due to factors such as mechanical resonance.

The operation display unit 23 is an interface that inputs an operation intended by the user to the machine tool 200 and displays the state of the machine tool 200.

The sound/vibration measurement unit 24 is a sensor that is installed near the driving machine unit 22 and measures sound or vibration emitted by the driving machine unit 22 in time series.

The synchronization unit 25 is a synchronization device that synchronizes operation data such as a rotation angle, a speed, and a current of each motor and measurement data which is time-series data of sound or vibration, from features of the time-series data.

When the user gives a start command to the machine tool 200 with the operation display unit 23, the control device 21 adds the synchronization command to the user command set in advance to drive the driving machine unit 22. The sound or vibration of the driving machine unit 22 emitted by the driving is measured by the sound/vibration measurement unit 24. The user of the machine tool 200 can acquire the synchronized operation data and measurement data through the operation display unit 23.

Figure 11:
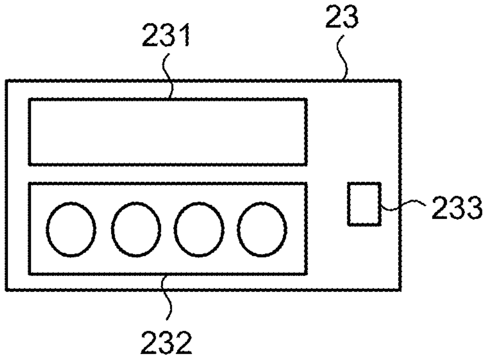
FIG. 11 is a diagram illustrating an example of a configuration of an operation display unit of a machine tool according to the second embodiment.

FIG. 11 is a diagram illustrating an example of a configuration of the operation display unit of the machine tool according to the second embodiment. As illustrated in FIG. 11, the operation display unit 23 includes a display 231, an operation switch 232, and a transmission/reception connector 233.

The display 231 is an output display device that displays the state of the machine tool 200. The display 231 may display the user command or information stored in the synchronization command storage unit 212 by operation. As a result, the user can check what kind of commands are currently stored in the machine tool 200.

The operation switch 232 is an operation means for operating the machine tool 200. The machine tool 200 can be driven and stopped by the operation switch 232.

The transmission/reception connector 233 is a connector for transmitting and receiving data between the control device 21 and a personal computer (PC) which is a computer system. The machine tool 200 is connected to the PC through a cable connected to the transmission/reception connector 233, and is capable of transmitting and receiving data. The communication performed by the transmission/reception connector 233 may be any communication that can be connected to the PC, regardless of a communication method thereof. In addition, data may be transmitted and received to and from the PC not by wired connection but by wireless connection.

The user of the machine tool 200 in the second embodiment first connects the PC and the machine tool 200 using the transmission/reception connector 233, and performs various settings regarding the operation of the machine tool 200. The settings performed here include information about the user command that affects how to operate the driving machine unit 22 and the synchronization command stored in the synchronization command storage unit 212.

After the above settings, the user drives the machine tool 200 by using the operation switch 232. In addition, when acquiring operation data in which the information about the driving of the machine tool 200 to be synchronized is recorded in time series, the user may acquire the operation data by communication with the PC via the transmission/reception connector 233.

Figure 12:
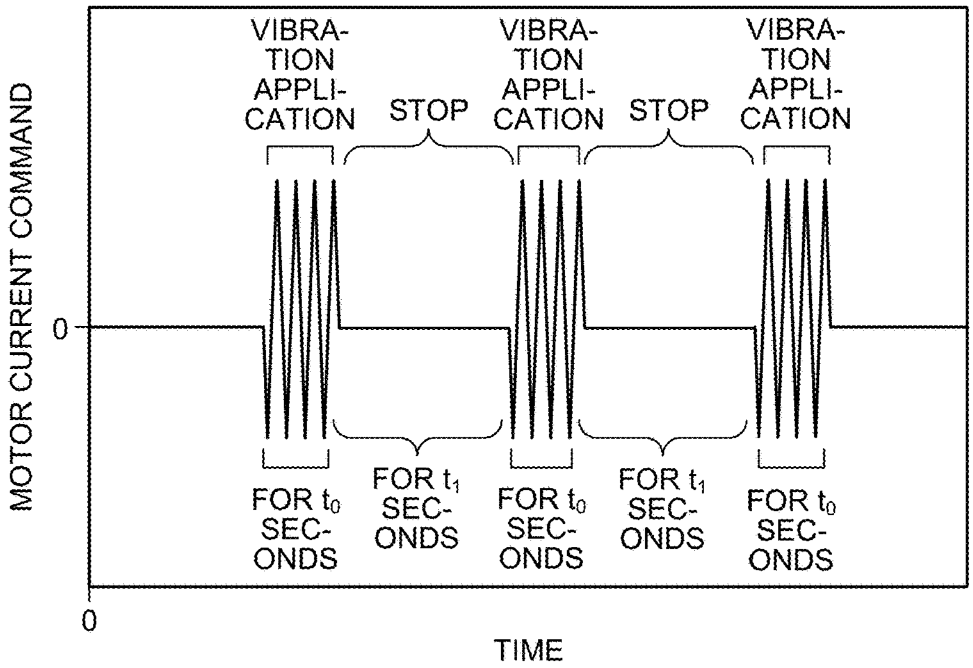
FIG. 12 is a diagram illustrating an example of a synchronization command used in the control device according to the second embodiment.

Next, a synchronization command used in the second embodiment will be described with a specific example. FIG. 12 is a diagram illustrating an example of a synchronization command used in the control device according to the second embodiment. FIG. 12 illustrates an example of a motor current command for determining the amount of current to be supplied to a motor as the synchronization command. That is, in FIG. 12, the horizontal axis represents time and the vertical axis represents the motor current command.

The synchronization command in this example repeats, a plurality of times, vibration application in which the motor is driven so as to generate vibration for $t_0$ seconds, and stop for $t_1$ seconds. In a vibration application section, which is a section in which vibration is applied, a motor current is vibrated forward and backward at short intervals to thereby finely drive the driving machine unit 22 to apply vibration. In a stop section, which is a section in which stop is performed, the motor current is set to 0 to stop the driving of the driving machine unit 22.

Figure 13:
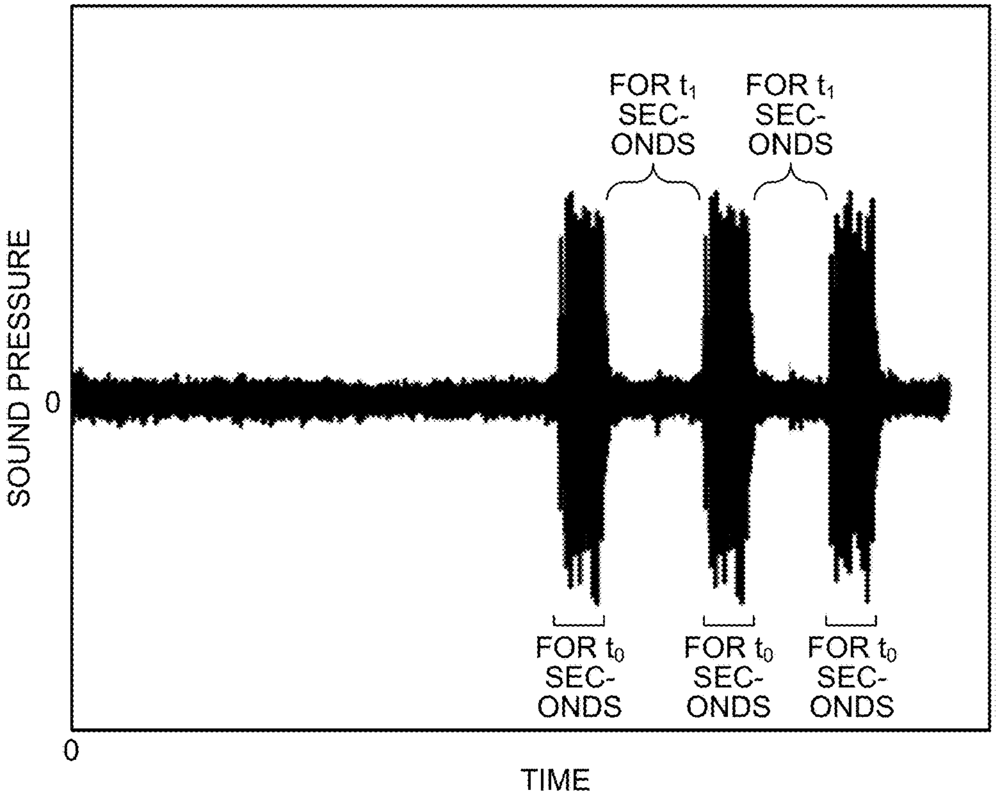
FIG. 13 is a diagram illustrating an example of measurement data of sound generated by a driving machine unit when driven by the synchronization command by the control device according to the second embodiment.

FIG. 13 is a diagram illustrating an example of measurement data of sound generated by the driving machine unit when driven by the synchronization command by the control device according to the second embodiment. In FIG. 13, the horizontal axis represents time and the vertical axis represents sound pressure. FIG. 13 illustrates a diagram in which time-series data of the sound pressure of the sound generated by the driving machine unit 22 is used as measurement data. Here, it is assumed that the synchronization command illustrated in FIG. 12 is used.

As illustrated in the measurement data of FIG. 13, regarding the driving machine unit 22, in the vibration application section of the synchronization command, vibration is applied to the motor, and sound or vibration is generated due to mechanical resonance or the like. On the other hand, in the stop section, sound or vibration to be generated by the driving of the motor due to mechanical resonance or the like is not generated, so that sound or vibration to be measured becomes relatively small.

The synchronization unit 25 which is a synchronization device connected to the machine tool 200 can acquire characteristic data of repetition of vibration application for $t_0$ seconds and stop for $T_1$ seconds regarding the motor current command which is information about the driving of the machine tool 200, and sound pressure data which is information about the state of sound or vibration of the driving machine unit 22. As a result, the synchronization unit 25 can perform synchronization with high accuracy by detecting the drive pattern. In addition, the frequency of the sound or vibration generated by applying vibration is specified to a certain extent by the device configuration. Therefore, the accuracy of synchronization can be improved by performing the synchronization only at the frequency.

The synchronization command may be any command that can be easily identified by the synchronization unit 25 that performs data synchronization, and a command that can be easily identified is preferably selected depending on a synchronization method and characteristics of a device to be used. In particular, in order to distinguish the synchronization command from the user command, it is desirable for the command to have a feature different from that of the user command. In addition, in order to make a distinction from irrelevant disturbance or noise, the command is desirably different from these.

As an example of the command that can be easily identified by the synchronization unit 25 that performs data synchronization, there is a command that generates sound or vibration at a specific intensity or a specific frequency at a predetermined time.

As conventionally known, a timing at which the intensity of sound or vibration exceeds a threshold is easily detected, and therefore, in synchronization of the operation data and the measurement data, it is possible to detect the synchronization command accurately and to perform synchronization. In addition, by measuring and comparing times taken until intensities of sounds or vibrations that have simultaneously exceeded the threshold become equal to or less than the threshold, it is possible to make a distinction from sound or vibration generated by driving not by the synchronization command. At that time, it is preferable that the predetermined time during which the intensity of the sound or vibration exceeds the threshold be sufficiently short relative to a drive time by the user command. By making the time sufficiently short, it is possible to reduce the effect of the user command on driving and to reduce the probability of erroneous synchronization by the user command.

Figure 14:
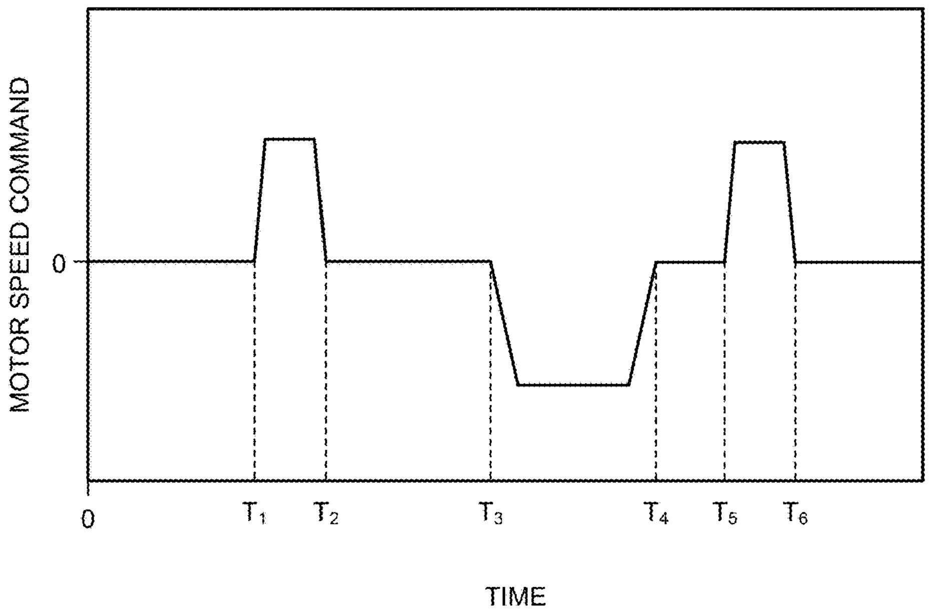
FIG. 14 is a diagram illustrating another example of the synchronization command used in the control device according to the second embodiment.

In addition, as another example, sound or vibration having a specific intensity or a specific frequency may be generated a plurality of times on a predetermined periodic basis. FIG. 14 is a diagram illustrating another example of the synchronization command used in the control device according to the second embodiment. FIG. 14 illustrates a synchronization command that generates sound or vibration having a specific intensity or a specific frequency a plurality of times on a predetermined periodic basis. In FIG. 14, the horizontal axis represents time and the vertical axis represents a motor speed command which is an example of the synchronization command.

In general, when a motor is driven, sound or vibration is generated simultaneously, and therefore, other commands than a vibration application command can be used as the synchronization command. Therefore, even in a case of a motor trapezoidal acceleration/deceleration command as illustrated in FIG. 14, driving sound or vibration is generated in a section in which the speed command is not 0, that is, a section from $T_1$ to $T_2$, a section from $T_3$ to $T_4$, and a section from $T_5$ to $T_6$. The synchronization unit 25 connected to the machine tool 200 can perform synchronization by detecting at least one of a time during which sound or vibration continues to be generated, a time during which sound or vibration stops, an interval between times when sound or vibration starts to be generated, and an interval between times when sound or vibration stops. In the case of FIG. 14, the time during which sound or vibration continues to be generated is the section from $T_1$ to $T_2$, the section from $T_3$ to $T_4$, and the section from $T_5$ to $T_6$, and the time during which sound or vibration stops is a section from $T_2$ to $T_3$ and a section from $T_4$ to $T_5$. In addition, the interval between times when sound or vibration starts to be generated is a section from $T_1$ to $T_3$ and a section from $T_3$ to $T_5$, and the interval between times when sound or vibration stops is a section from $T_2$ to $T_4$ and a section from $T_4$ to $T_6$. By selecting a plurality of sections to be detected, differentiation from the user command is made, and the probability of erroneously detecting the user command is reduced.

For example, in a case where synchronization is performed on the basis of the correlation between the motor speed command and sound, the synchronization can be accurately performed by increasing or decreasing the speed a plurality of times. At that time, the respective times $T_1$, $T_2$, $T_3$, $T_4$, $T_5$, and $T_6$ are not necessarily times at regular intervals. By setting the respective times at different intervals, errors due to autocorrelation can be reduced, and the accuracy of synchronization by correlation can be improved.

Settings of times such as the time during which sound or vibration continues to be generated used for these detections may be stored in the synchronization command storage unit 212 as parameters. As a result, even in a case where the user erroneously performs synchronization by the user command or the like, the probability of erroneous synchronization can be reduced by adjusting the parameters.

Other examples of the synchronization command include a command to use a plurality of motors to simultaneously generate sounds of a plurality of frequencies such as a chord, and a command to change sound and vibration in accordance with a certain pattern, for example, to change a frequency by a command of a torsional frequency or the like.

In general, when a motor is driven, sound or vibration is generated simultaneously, and therefore, any command of the motor can be used as the synchronization command. However, in a case where sound or vibration increases in a specific drive pattern due to resonance or the like, or a case where sound or vibration of a specific frequency is generated therein, it is desirable to use such a pattern. In addition, from the viewpoint of not affecting the user command which is a command intended by the user, a command is desirable which makes the state of the driving machine unit 22 the same between the start and end of the synchronization command.

The control device 21 according to the second embodiment adds, to the user command, the synchronization command different from the user command which is an operation pattern of the machine tool 200 set by the user. Since the synchronization command is independent of the user command, synchronization can be stably performed regardless of the user command. In particular, even in a case where the user command is a command that hardly generates sound or vibration, or a case where the user command is changed due to a change in use of the machine, maintenance thereof, or the like, the synchronization can be stably performed.

The control device 21 according to the second embodiment superimposes the synchronization command on the motor command, and generates sound or vibration by driving the motor. That is, a motor or a machine is used as the oscillation device 12. As a result, the operation data and the measurement data can be synchronized only with an existing device without adding an external device such as a buzzer or a siren as the oscillation device 12 to the configuration. That is, since no external device is added, sound or vibration for synchronization can be generated without increasing cost. In addition, as a result, a characteristic waveform is added to both the operation data representing the operation of the machine and driving sound or vibration at the same timing, and therefore there is an effect that the synchronization accuracy can be further improved.

The control device 21 according to the second embodiment uses, as the synchronization command, the vibration application command that generates sound or vibration of a specific intensity or a specific frequency a plurality of times on a predetermined periodic basis. As a result, the synchronization command is differentiated from the user command, and the probability of erroneously detecting the user command can be reduced.

The machine tool 200 according to the second embodiment can change the synchronization command by rewriting the parameters stored in the synchronization command storage unit 212. As a result, even in a case where synchronization is erroneously performed by the user command, the synchronization command can be adjusted so as to reduce the probability of an error.

Third Embodiment

Figure 15:
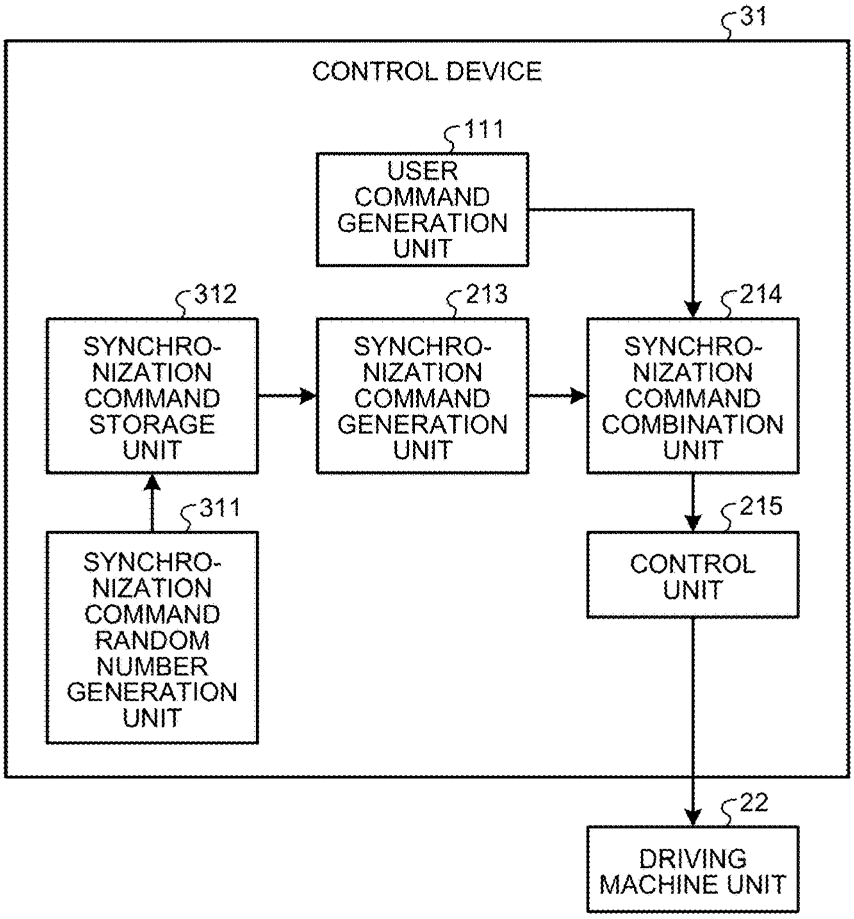
FIG. 15 is a block diagram illustrating an example of a functional configuration of a control device according to a third embodiment.

FIG. 15 is a block diagram illustrating an example of a functional configuration of a control device according to a third embodiment. A control device 31 according to the third embodiment differs from the control device 21 according to the second embodiment only in a method of generating a synchronization command. Hereinafter, the same components as those in the first and second embodiments will be denoted by the same reference numerals as those therein, descriptions thereof will be omitted, and differences therefrom will be described.

As illustrated in FIG. 15, the control device 31 according to the third embodiment includes the user command generation unit 111, a synchronization command random number generation unit 311, a synchronization command storage unit 312, the synchronization command generation unit 213, the synchronization command combination unit 214, and the control unit 215.

The synchronization command random number generation unit 311 generates a random number for one or a plurality of parameters used for the synchronization command at the time of determining the user command or immediately before starting execution of the user command. At that time, regarding the random number, it is only required to randomly generate a numerical value within a predetermined range depending on a corresponding parameter, and a generation method thereof is not particularly limited. An example of the parameter is at least one or more of an intensity, a frequency, a generation duration, and a period of sound or vibration generated by the synchronization command. When random numbers are generated by a plurality of devices simultaneously, from the viewpoint of generating different random numbers in respective devices, it is desirable to generate the random numbers by using a device-specific value such as a manufacturing identification number of each device as a seed. The synchronization command random number generation unit 311 corresponds to a random number generation unit.

The synchronization command storage unit 312 stores the random numbers generated by the synchronization command random number generation unit 311 as parameters of the synchronization command.

Figure 16:
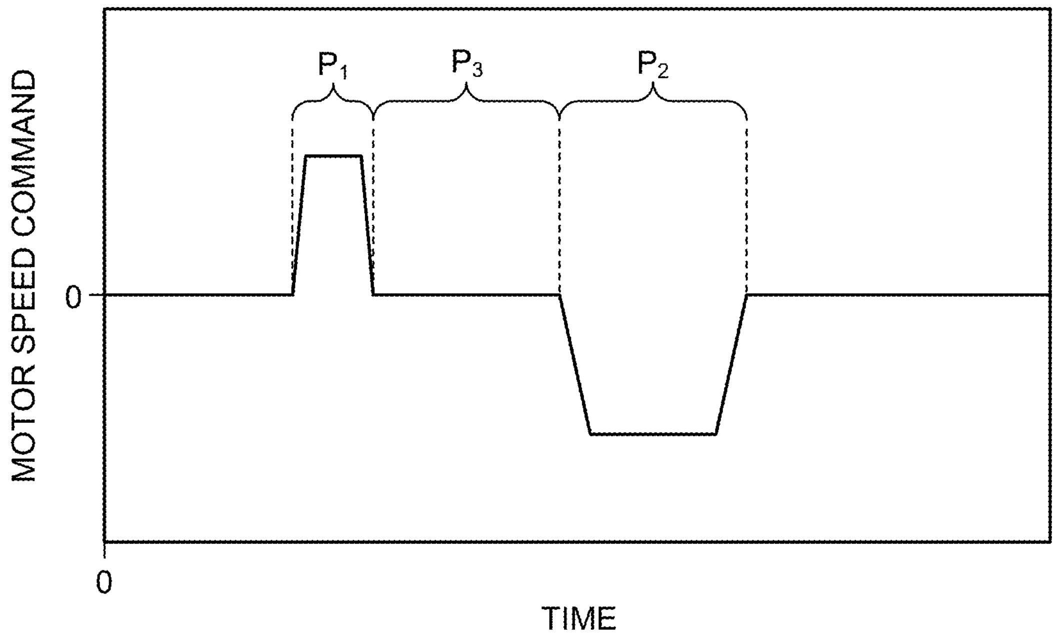
FIG. 16 is a diagram illustrating an example of a synchronization command used in the control device according to the third embodiment.

FIG. 16 is a diagram illustrating an example of a synchronization command used in the control device according to the third embodiment. In FIG. 16, the horizontal axis represents time and the vertical axis represents a motor speed command which is an example of the synchronization command. As illustrated in FIG. 16, the synchronization command used in the control device 31 according to the third embodiment has two trapezoidal speed commands and has three parameters $P_1$, $P_2$, and $P_3$. The three parameters $P_1$, $P_2$, and $P_3$ of the synchronization command are each a parameter representing a time in a section of the synchronization command. $P_1$ represents a drive time of a first trapezoidal speed command, $P_2$ represents a drive time of a second trapezoidal speed command, and $P_3$ represents a time during which the motor stops between the two trapezoidal speed commands, that is, a time from the end of the first trapezoidal speed command to the start of the second trapezoidal speed command.

The synchronization command random number generation unit 311 generates a random number in a predetermined range for each of the three parameters $P_1$, $P_2$, and $P_3$, and determines a pattern of the synchronization command. Note that, here, a case has been described where the random number in the predetermined range is generated for each of the parameters in the configuration of the second embodiment, but a random number in a predetermined range may be generated for a parameter in the configuration of the first embodiment.

The control device 31 according to the third embodiment generates the synchronization command on the basis of a random number generated at the time of determining the user command or immediately before starting execution of the user command, superimposes the synchronization command on the motor command, and generates sound or vibration by driving the motor. As a result, even in a case of execution using a plurality of collocated devices having the same configuration, the synchronization can be performed by different synchronization commands. Therefore, the probability of erroneous synchronization due to sound or vibration by another device can be reduced.

The control device 31 according to the third embodiment generates a plurality of random numbers as parameters that define the pattern of the synchronization command. By determining the command pattern using the plurality of random numbers, it is possible to facilitate identification from a synchronization command generated by another device and to reduce the probability of erroneous synchronization.

The control device 31 according to the third embodiment stores, in the synchronization command storage unit 312, the random number generated at the time of determining the user command or immediately before starting execution of the user command. As a result, it is possible to reproduce a kind of synchronization command that has been added at the time of performing synchronization, and the synchronization can be performed without errors.

Next, hardware configurations of the control devices 11, 21, and 31 according to the first to third embodiments will be described. The user command generation unit 111, the synchronization command generation units 113 and 213, the synchronization command output unit 114, the synchronization command combination unit 214, the control unit 215, and the synchronization command random number generation unit 311 are implemented by processing circuitry. The processing circuitry may be a memory that stores a program and a processor that executes the program stored in the memory, or may be dedicated hardware. The processing circuitry is also referred to as a control circuit.

Figure 17:
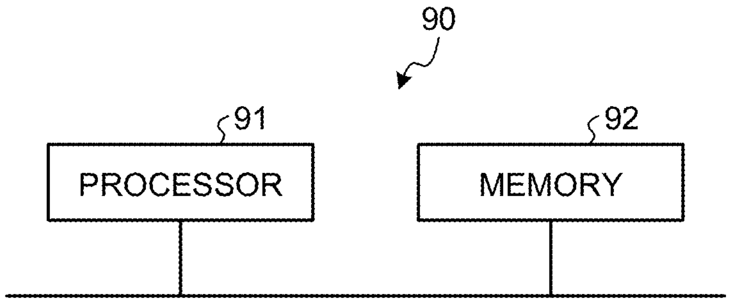
FIG. 17 is a diagram illustrating an example of a configuration of a processing circuitry in a case where a processing circuitry included in the control devices according to the first to third embodiments is realized by a processor and a memory.

FIG. 17 is a diagram illustrating an example of a configuration of processing circuitry in a case where processing circuitry included in the control devices according to the first to third embodiments is implemented by a processor and a memory. Processing circuitry 90 illustrated in FIG. 17 is a control circuit, and includes a processor 91 and a memory 92. In a case where the processing circuitry 90 is constituted with the processor 91 and the memory 92, functions of the processing circuitry 90 are implemented by software, firmware, or a combination of software and firmware. The software or the firmware is described as a program and stored in the memory 92. In the processing circuitry 90, the processor 91 reads and executes the program stored in the memory 92, thereby implementing the functions. That is, the processing circuitry 90 includes the memory 92 for storing a program with which a process of each of the control devices 11, 21, and 31 is executed as a result. It can also be said that this program is a program for causing the control devices 11, 21, and 31 to execute the functions implemented by the processing circuitry 90. This program may be provided by a storage medium having the program stored therein, or may be provided by other means such as a communication medium.

Here, the processor 91 is, for example, a central processing unit (CPU), a processing device, an arithmetic device, a microprocessor, a microcomputer, a digital signal processor (DSP), or the like. The memory 92 corresponds to, for example, a non-volatile or volatile semiconductor memory such as a random access memory (RAM), a read only memory (ROM), a flash memory, an erasable programmable ROM (EPROM), or an electrically EPROM (EEPROM (registered trademark)), a magnetic disk, a flexible disk, an optical disk, a compact disc, a mini disk, or a digital versatile disc (DVD).

Figure 18:
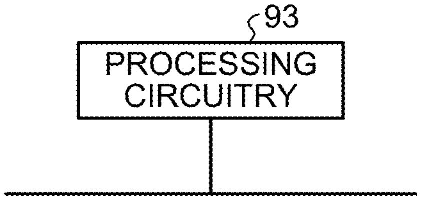
FIG. 18 is a diagram illustrating an example of a configuration of a processing circuitry in a case where the processing circuitry included in the control devices according to the first to third embodiments is realized by dedicated hardware.

FIG. 18 is a diagram illustrating an example of a configuration of processing circuitry in a case where the processing circuitry included in the control devices according to the first to third embodiments is implemented by dedicated hardware. Processing circuitry 93 illustrated in FIG. 18 corresponds to, for example, a single circuit, a composite circuit, a programmed processor, a parallel programmed processor, an application specific integrated circuit (ASIC), a field programmable gate array (FPGA), or a combination thereof. A part of the processing circuitry 93 may be implemented by dedicated hardware and another part thereof may be implemented by software or firmware. Thus, the processing circuitry 93 can implement each of the above-described functions by dedicated hardware, software, firmware, or a combination thereof. The control devices 11, 21, and 31 according to the first to third embodiments may be each a personal computer that executes a machine control program which is a program in which processes from step S12 to step S14 in FIG. 3 are described.

The configurations described in the above embodiments are merely examples and can be combined with other known technology, the embodiments can be combined with each other, and part of the configurations can be omitted or modified without departing from the gist thereof.

REFERENCE SIGNS LIST

11, 21, 31 control device; 12 oscillation device; 13 blower; 14 controller; 15 inverter; 16 logger; 17 measurement device; 18 inspection terminal; 22 driving machine unit; 23 operation display unit; 24 sound/vibration measurement unit; 25, 183 synchronization unit; 100 blowing device; 111 user command generation unit; 112, 212, 312 synchronization command storage unit; 113, 213 synchronization command generation unit; 114 synchronization command output unit; 171 measurement unit; 172 recording unit; 181 operation data acquisition unit; 182 measurement data acquisition unit; 184 output unit; 190 blowing system; 200 machine tool; 214 synchronization command combination unit; 215 control unit; 231 display; 232 operation switch; 233 transmission/reception connector; 311 synchronization command random number generation unit.

The invention claimed is:

1. A control device that is connected to a synchronization device synchronizing operation data obtained by acquiring information about driving of a machine in time series and measurement data obtained by acquiring information about sound or vibration of the machine in time series by using features of data acquired in time series, the control device comprising:

user command generation circuitry to generate a user command that is a command to drive the machine in accordance with an instruction from a user of the control device;

synchronization command storage circuitry to store reproduction information capable of reproducing a synchronization command that is a command different from and independent of the user command and used for synchronizing the operation data with the measurement data at a predetermined timing;

synchronization command generation circuitry to generate the synchronization command on a basis of the reproduction information; and synchronization command output circuitry to output, at a predetermined timing of the user command, the synchronization command to an oscillation device to cause the oscillation device to generate sound or vibration, and to add an effect of the synchronization command to the measurement data.

2. The control device according to claim 1, wherein sound or vibration generated by the synchronization command is sound or vibration that continues to be generated at a specific intensity or a specific frequency for a predetermined time.

3. The control device according to claim 1, wherein sound or vibration generated by the synchronization command is sound or vibration that has a specific intensity or a specific frequency and is generated a plurality of times on a predetermined periodic basis.

4. The control device according to claim 1, further comprising:

random number generation circuitry to generate a random number and to store a generated random number value in the synchronization command storage circuitry, wherein the synchronization command generation circuitry determines at least one or more of an intensity, a frequency, a generation duration, and a period of sound or vibration generated by the synchronization command on the basis of a random number value obtained by the random number generation circuitry.

5. A synchronization system comprising:

the control device according to claim 1; and the synchronization device.

6. The control device according to claim 1, wherein the reproduction information comprises a command pattern capable of reproducing the synchronization command at the predetermined timing.

7. The control device according to claim 1, wherein the synchronization command storage circuitry stores command execution position information indicating at which timing of the user command the synchronization command is executed.

8. The control device according to claim 1, wherein the oscillation device generates sound or vibration with a frequency different from the sound or vibration of the machine to affect the measurement data without driving the machine.

9. The control device according to claim 1, wherein the synchronization command is started at a first predetermined time before start of driving of the machine by the user command and is continuously output for a second predetermined time shorter than the first predetermined time.

10. A control device that is connected to a synchronization device synchronizing operation data obtained by acquiring information about driving of a machine in time series and measurement data obtained by acquiring information about sound or vibration of the machine in time series by using features of data acquired in time series, and controls the machine, the control device comprising:

user command generation circuitry to generate a user command that is a command to drive the machine in accordance with an instruction from a user of the control device;

synchronization command storage circuitry to store reproduction information capable of reproducing a synchronization command that is a command different from and independent of the user command and used for synchronizing the operation data with the measurement data at a predetermined timing;

synchronization command generation circuitry to generate the synchronization command that is a drive command for driving the machine on a basis of the reproduction information;

command combination circuitry to calculate a combined command in which the synchronization command is added at a predetermined timing of the user command; and control circuitry to control the machine on a basis of the combined command, and to cause the machine to generate sound or vibration by driving of the machine by the synchronization command.

11. The control device according to claim 10, wherein sound or vibration generated by the synchronization command is sound or vibration that continues to be generated at a specific intensity or a specific frequency for a predetermined time.

12. The control device according to claim 10, wherein sound or vibration generated by the synchronization command is sound or vibration that has a specific intensity or a specific frequency and is generated a plurality of times on a predetermined periodic basis.

13. The control device according to claim 10, further comprising:

random number generation circuitry to generate a random number and to store a generated random number value in the synchronization command storage circuitry, wherein the synchronization command generation circuitry determines at least one or more of an intensity, a frequency, a generation duration, and a period of sound or vibration generated by the synchronization command on the basis of a random number value obtained by the random number generation circuitry.

14. A synchronization system comprising:

the control device according to claim 10; and the synchronization device.

15. The control device according to claim 10, wherein the synchronization command is added to the user command such that the sound or vibration generated by the machine serves as a feature for synchronization in both the operation data and the measurement data.

16. The control device according to claim 10, wherein the reproduction information comprises a time-series command of a position command, a time-series command of a speed command, a current command of the synchronization command, an output time of the synchronization command, a stop time of the synchronization command, or a numerical value that defines a synchronization motor command that includes a moving distance or a maximum speed of the machine.

17. The control device according to claim 10, wherein the synchronization command makes a state of the machine the same between a start and an end of the synchronization command.

18. A machine control method performed by a control device that is connected to a synchronization device synchronizing operation data obtained by acquiring information about driving of a machine in time series and measurement data obtained by acquiring information about sound or vibration of the machine in time series by using features of data acquired in time series, the machine control method comprising:

generating a user command that is a command to drive the machine in accordance with an instruction from a user of the control device;

storing reproduction information capable of reproducing a synchronization command that is a command different from and independent of the user command and used for synchronizing the operation data with the measurement data at a predetermined timing;

generating the synchronization command on a basis of the reproduction information; and outputting, at a predetermined timing of the user command, the synchronization command to an oscillation device to cause the oscillation device to generate sound or vibration, and adding an effect of the synchronization command to the measurement data.

19. The machine control method according to claim 18, wherein the oscillation device is connected to the control device.

20. The machine control method according to claim 19, wherein the oscillation device is a buzzer or a siren attached to the machine.

* * * * *